(12) United States Patent
Monismith et al.

(10) Patent No.: US 11,600,808 B2
(45) Date of Patent: Mar. 7, 2023

(54) SYSTEMS AND METHODS FOR POTASSIUM ENHANCING SILICON-CONTAINING ANODES FOR IMPROVED CYCLABILITY

(71) Applicant: CHONGQING JINKANG POWERTRAIN NEW ENERGY CO., LTD., Chongqing (CN)

(72) Inventors: Scott Monismith, Santa Clara, CA (US); Brennan Campbell, Santa Clara, CA (US); Ying Liu, Santa Clara, CA (US); Yifan Tang, Santa Clara, CA (US)

(73) Assignee: CHONGQING JINKANG POWERTRAIN NEW ENERGY CO., LTD., Chongqing (CN)

( * ) Notice: Subject to any disclaimer, the term of this patent is extended or adjusted under 35 U.S.C. 154(b) by 93 days.

(21) Appl. No.: 17/372,711

(22) Filed: Jul. 12, 2021

(65) Prior Publication Data

US 2021/0343994 A1   Nov. 4, 2021

Related U.S. Application Data

(63) Continuation of application No. 16/357,267, filed on Mar. 18, 2019, now Pat. No. 11,121,353.

(51) Int. Cl.
*H01M 4/04* (2006.01)
*H01M 4/485* (2010.01)
(Continued)

(52) U.S. Cl.
CPC ......... *H01M 4/0416* (2013.01); *H01M 4/049* (2013.01); *H01M 4/131* (2013.01); *H01M 4/134* (2013.01); *H01M 4/136* (2013.01); *H01M 4/1391* (2013.01); *H01M 4/1395* (2013.01); *H01M 4/1397* (2013.01);
(Continued)

(58) Field of Classification Search
CPC .. H01M 4/0416; H01M 4/149; H01M 4/1395; H01M 4/366; H01M 4/386
See application file for complete search history.

(56) References Cited

U.S. PATENT DOCUMENTS

| 11,121,353 B2 | 9/2021 | Monismith et al. |
| 2009/0076194 A1 | 3/2009 | Meyer et al. |
| 2011/0086271 A1 | 4/2011 | Lee et al. |

OTHER PUBLICATIONS

Notice of Allowance for U.S. Appl. No. 16/357,267 dated May 26, 2021, 9 pages.

*Primary Examiner* — Stephan J Essex
(74) *Attorney, Agent, or Firm* — Cooper Legal Group, LLC

(57) ABSTRACT

Various methods and techniques for enhancing a silicon-containing anode for a battery cell are presented. The methods may include providing a silicon-containing anode having reversible electrochemical capabilities including a silicon-containing material and an anode material compatible with a lithium-ion battery chemistry having porous and conductive mechanical properties. The methods may also include enriching a surface layer of the silicon-containing anode with sodium ions to intersperse the sodium ions between silicon atoms of the silicon-containing material. The methods may also include displacing the sodium ions with potassium ions to form a compression layer in the silicon-containing anode. The potassium ions may place the silicon atoms of the silicon-containing material in a pre-compressive state to counteract internal stress exerted on the silicon-containing material.

20 Claims, 7 Drawing Sheets

(51) Int. Cl.
  *H01M 4/38*     (2006.01)
  *H01M 4/58*     (2010.01)
  *H01M 4/131*    (2010.01)
  *H01M 4/134*    (2010.01)
  *H01M 4/136*    (2010.01)
  *H01M 4/1391*   (2010.01)
  *H01M 4/1395*   (2010.01)
  *H01M 4/1397*   (2010.01)
  *H01M 10/0525*  (2010.01)
  *H01M 4/36*     (2006.01)
  *H01M 4/02*     (2006.01)

(52) U.S. Cl.
  CPC ........... *H01M 4/366* (2013.01); *H01M 4/386* (2013.01); *H01M 4/485* (2013.01); *H01M 4/58* (2013.01); *H01M 10/0525* (2013.01); *H01M 2004/027* (2013.01); *H01M 2220/20* (2013.01)

SYSTEMS AND METHODS FOR POTASSIUM ENHANCING SILICON-CONTAINING ANODES FOR IMPROVED CYCLABILITY

CROSS-REFERENCE TO RELATED APPLICATIONS

This application is a continuation of U.S. application Ser. No. 16/357,267, filed Mar. 18, 2019, which is incorporated here by reference.

BACKGROUND

As battery technology has become more advanced so have the use of batteries within electric vehicles (EV). In some instances, such as commuter vehicles, EVs aim to replace traditional gas-combustion vehicles as EVs offer a more environmental friendly solution. However, in order for EVs to eventually replace gas-combustion vehicles, EVs must be able comparably operate. One possible drawback of EVs is their reduction in driving range. Limiting weight and space requirements of EVs restrict the amount of batteries onboard EVs. Hence, energy capacity and cyclability are important properties of batteries within EVs. Therefore, there is a need for improved energy capacity and cyclability of battery cells within EVs.

SUMMARY

Various embodiments are described related to a method for enhancing a silicon-containing anode for a battery cell. The method for enhancing a silicon-containing anode for a battery cell may include providing a silicon-containing anode having reversible electrochemical capabilities. The silicon-containing anode may include a silicon-containing material and an anode material compatible with a lithium-ion battery chemistry having porous and conductive mechanical properties. The method may also include enriching a surface layer of the silicon-containing anode with sodium ions to intersperse the sodium ions between silicon atoms of the silicon-containing material. For example, enriching the surface layer of the silicon-containing anode with sodium ions may include immersing the silicon-containing material in a sodium nitrate solution. The method may also include displacing the sodium ions with potassium ions to form a compression layer in the silicon-containing anode. The potassium ions may place the silicon atoms of the silicon-containing material in a pre-compressive state to counteract internal stress exerted on the silicon-containing material. In embodiments, displacing the sodium ions with the potassium ions to form the compression layer may include immersing the surface layer of the silicon-containing material enriched with the sodium ions in a potassium nitrate solution.

In some embodiments, a method for enhancing a silicon-containing anode for a battery cell is described. The method may include providing a silicon-containing anode comprising a silicon-containing material. Optionally, the silicon-containing anode may include 3 to 30 percent by weight silicon. Exemplary silicon-containing materials may include at least one of a silicene, a silicon oxide, or a silicon carbide. In embodiments, the silicon-containing anode may have reversible electrochemical capabilities and may include an anode material compatible with lithium-ion battery chemistry having porous and conductive mechanical properties. The method may include enriching a surface layer of the silicon-containing material with sodium ions. In embodiments, enriching the surface layer of the silicon-containing material with the sodium ions may include immersing the silicon-containing material in a sodium-containing solution. For example, the sodium-containing solution may include a sodium nitrate solution or the sodium-containing solution may include a salt bath.

The method may include following enriching the surface layer of the silicon-containing material with the sodium ions, displacing some of the sodium ions with potassium ions to form a compression layer within the silicon-containing anode to counteract internal stress exerted on the silicon-containing material. The compression layer within the silicon-containing anode may counteract internal stress exerted on the silicon-containing material by placing silicon atoms within the silicon-containing material in a pre-compressive state. In embodiments, displacing the sodium ions with the potassium ions to form the compression layer includes immersing the surface layer of the silicon-containing material enriched with the sodium ions in a potassium-containing solution. In exemplary embodiments, the potassium solution may include a potassium nitrate solution.

In some embodiments, an enhanced silicon-containing anode for a battery cell is described. The enhanced silicon-containing anode for a battery cell may include an anode material having reversible electrochemical capabilities. Optionally, the enhanced silicon-containing anode may be part of a battery cell. The enhanced silicon-containing anode for a battery cell may also include a silicon-containing material comprising silicon particles. In embodiments, the silicon-containing material may include 3 to 30 weight percent silicon. For example, the silicon-containing material may include at least one of silicene, SiC, SiO, $SiO_2$, $SiO_3$, or $SiO_4$. In exemplary embodiments, the silicon-containing material may include a silicon oxide.

The enhanced silicon-containing anode for a battery cell may also include a compression layer having potassium ions interspersed between the silicon particles in a surface layer of the silicon-containing material. The potassium ions in the compression layer may counteract internal stress exerted on the silicon particles by placing the silicon-containing material in a pre-compressive state. In some embodiments, the surface layer may extend from a surface of the silicon-containing material to a depth of 100 nm towards a bulk of the silicon-containing material. In embodiments, the compression layer may be formed by enriching the surface layer of the silicon-containing material with sodium ions by immersing the silicon-containing material in a sodium-containing solution. Following enriching the surface layer of the silicon-containing material with the sodium ions, the sodium ions may be displaced with the potassium ions by immersing the silicon-containing material in a potassium-containing solution. In some embodiments, the enhanced silicon-containing anode may further include sodium ions.

DETAILED DESCRIPTION

For battery cells, it may be important and desirable to increase the energy density of the battery cell. Especially, as battery cells decrease in size, it may be important to increase the energy density of battery cells to maintain or increase the battery cell performance. One method of increasing energy density of battery cells is to increase the silicon content within the anode of the battery cells. Silicon may accommodate up to 4.4 lithium ions per silicon atom, while carbon may only accommodate ⅙ of a lithium ion per carbon atom. By increasing the silicon content of the anode, the energy capacity of the battery cell may increase by a factor of 25 compared to carbon anodes. However, increasing the silicon content of an anode may negatively impact the cyclability and working life of the battery cell.

When lithium ions intercalate into silicon, silicon may swell as much as 350 to 400 percent. This swelling of the silicon may lead to tensile stresses developing within the material containing the silicon and the anode itself. Cracks may form along the silicon-containing material's surface or gaps may form between the electrolyte and the anode under the tensile stresses of the swelling. The damage caused by the tensile stress may expose the anode to solid electrolyte interface (SEI) or lithium plating. Such damage may cause irreversible capacity loss for the battery cell. Because lithium ion intercalation occurs every time the battery cell undergoes a charging or discharging process, damage to the battery cell caused by the swelling of the silicon may accumulate quickly. For example, at certain silicon content levels, a battery cell may undergo less than ten charging cycles (e.g., a charging process and a discharging process), before irreversible capacity loss occurs. Swelling induced capacity loss may be a significant inhibitor to silicon adaptation in lithium ion batteries.

To manage the volumetric expansion of silicon during charging and discharging processes, techniques for chemically toughing a silicon-containing anode are disclosed herein. Chemically toughing the silicon-containing anode may include enhancing the silicon-containing anode by enriching a surface layer of the silicon-containing anode with sodium ions. The sodium ions may intersperse between the silicon particles (e.g., silicon atoms). The sodium ions may be displaced by potassium ions to form a compression layer within the silicon-containing anode. In embodiments, the compression layer may be formed within the silicon-containing material of the silicon-containing anode. By maintaining the silicon within the silicon-containing material in a pre-compressive state, the internal stresses exerted by the swelling of the silicon during intercalation may be counteracted, thereby eliminating and/or reducing the damage-potential to the anode during charging and discharging processes.

Figure 1:
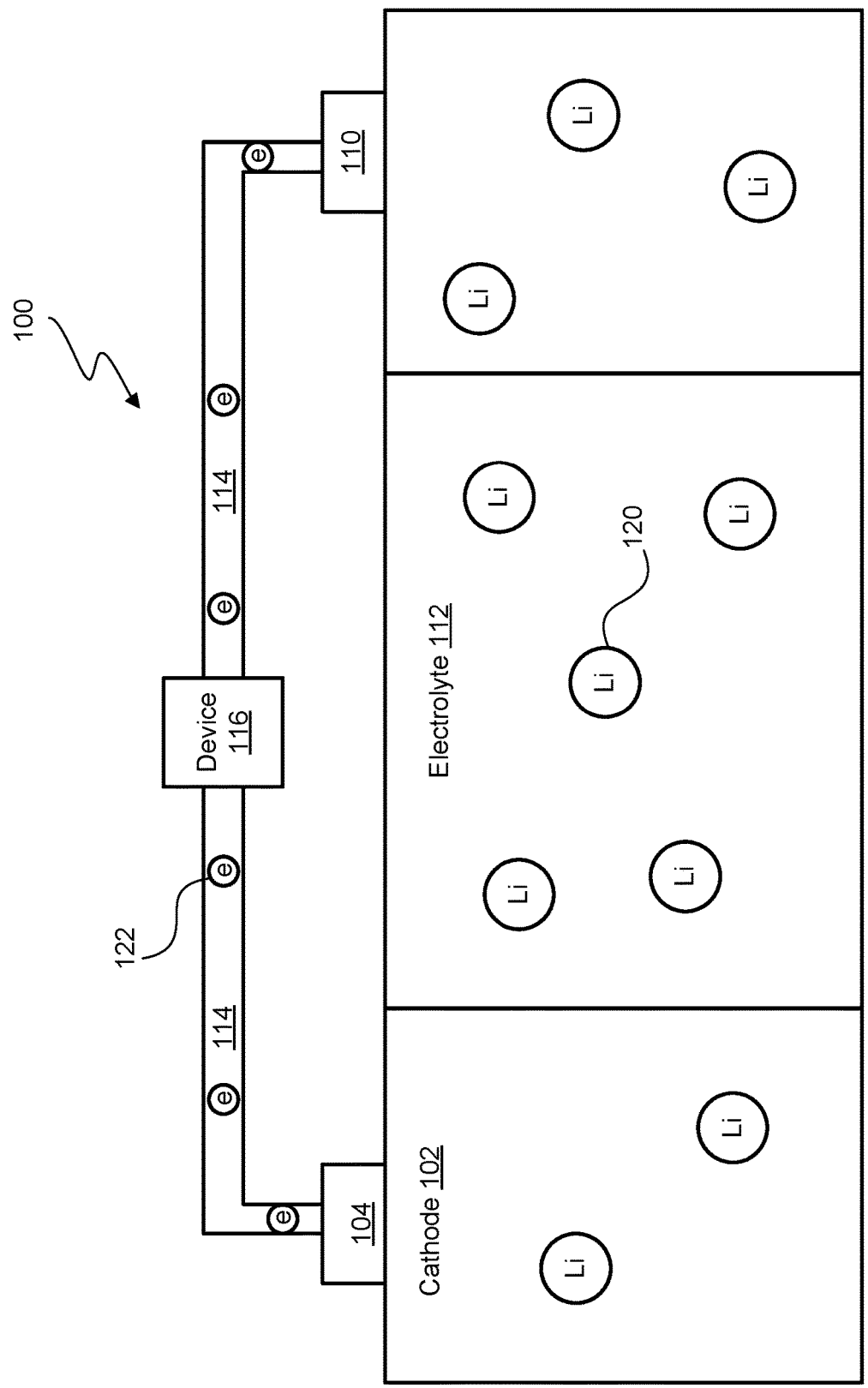
FIG. 1 illustrates an exemplary battery cell according to an embodiment as disclosed herein.

Further detail regarding such embodiments and additional embodiments is provided in relation to the figures. FIG. 1 depicts exemplary battery cell 100 that may be implemented by one or more embodiments. Battery cell 100 may be a cell within a Lithium Ion (Li-ion) battery. Battery cell 100 may produce electrical energy from electrochemical and/or chemical reactions. Battery cell 100 may have reversible electrochemical capabilities such to allow for repeated charging and discharging cycles without impacting the energy density or workable life of battery cell 100. Battery cell 100 may include cathode 102, terminal 104, anode 108, terminal 110, electrolyte 112 and electron path 114. The arrangement of battery cell 100 and respective components may vary depending on the configuration of battery cell 100. In some embodiments, battery cell 100 may be cylindrical in shape having cathode 102 and anode 108 on a top surface or on opposite surfaces from one another. Exemplary cylindrical battery cells 100 may include a 18650, 20700, 21700, or 22700 Li-ion battery cell. However, in other embodiments, battery cell 100 may be rectangular, square, button, or in a pouch-like form.

Cathode 102 may be a positive electrode comprised of different material types. For example, cathode 102 may include lithium-cobalt oxide ($LiCoO_2$), lithium iron phosphate ($LiFePO_4$), and/or another metal based alloy. In embodiments, cathode 102 may include layered oxides similar to $LiCoO_2$ but with added metals such as nickel, manganese and aluminum. For example, cathode 102 may include NCA (nickel cobalt aluminum) and NMC (nickel manganese cobalt). Cathode 102 may, prior to the initiation of a charging process, contain a plurality of lithium ions 120. During the charging process, the lithium ions 120 (e.g., positively charged lithium ions) within cathode 102 may flow, via electrolyte 112, to anode 108. During a discharging process the opposite may take place and lithium ions 120 within anode 108 may flow, via electrolyte 112, back to cathode 102.

Terminal 104 may be a current collector attached to cathode 102. Terminal 104 may be a positive current collector. Terminal 104 may include various materials including, but not limited to, aluminum, copper, nickel, gold, silver and/or compounds including copper, nickel, aluminum, gold, and/or silver, or any other metal suitable. During a charging process, lithium ions 120 within cathode 102 may flow from cathode 102 and electrons 122 may be released. These electrons 122 may flow from cathode 102 to terminal 104 and then from terminal 104, via electron path 114, to terminal 110. Because current flows in the opposite direction of electrons, terminal 104 may collect current during the charging process.

In some embodiments, battery cell 100 may be a solid state lithium ion battery, having electrolyte 112 in a solid state positioned between anode 108 and cathode 102. In such embodiments, electrolyte 112 may separate cathode 102 and anode 108 while allowing lithium ions 120 to flow between cathode 102 and anode 108. By preventing electron flow between anode 108 and cathode 102, the electrons 122 may be forced to flow via electron path 114. However, in other embodiments, battery cell 100 may be a conventional lithium ion battery and a separator (not shown) may separate the anode 108 from the cathode 102 In such embodiments, electrolyte 112 may be a liquid electrolyte and anode 108 and cathode 102 may be partially or fully immersed or saturated with electrolyte 112 in the liquid state. For example, in such embodiments, electrolyte 112 may be solution of solvents, salts, and/or additivities that acts as a transport medium for lithium ions 120. In some cases, the separator may also be submerged or partially submerged in electrolyte 112.

Anode 108 may be a negative electrode comprised of different material types. Anode 108 may include one or more materials, such as a silicon-containing material. In embodiments, the silicon-containing material may include a silicon oxide ($SiO_x$), silicene, or silicon carbon composites, such as silicon carbide (SiC). In exemplary cases, the silicon-containing material may include silicon nanoparticles embedded in a $SiO_x$ matrix and silicon carbon nanocomposites. Anode 108 may also include an anode material compatible with lithium-ion battery chemistry, having porous and conductive properties. Exemplary anode materials may include silicon carbon composites, silicon oxides, lithium (e.g., lithium titanate, lithium metal, lithium-tin alloys), and/or compounds including silicon carbon composites, silicon oxides, and/or lithium. The anode material may be compatible with lithium-ion battery chemistry (solution, salts, and/or binders) such that the anode material may support efficient and effective charging and discharging cycles of anode 108 without impacting the energy density or workable life of battery cell 100. In an embodiment, the anode material may be compatible with lithium-ion battery chemistry such that little to no damage may occur to the battery cell 100. For example, the anode material may allow the battery cell 100 to maintain a consistent state of charge (or energy density) for 50 days with normal use. Anode 108 may, prior to the initiation of a charging process, contain none or a small amount of lithium ions 120. During the charging process, lithium ions 120 (e.g., positively charged lithium ions) within cathode 102 may flow, via electrolyte 112, to anode 108. During a discharging process, the opposite may take place and lithium ions 120 within anode 108 may flow, via electrolyte 112, and to cathode 102.

Terminal 110 may be a current collector attached to anode 108. Terminal 110 may be a negative current collector. Terminal 110 may include various materials including, but not limited to, aluminum, nickel coated steel, and/or compounds based on aluminum, nickel, or any other suitable metal. During a charging process, electrons 122 may flow to from cathode 102 to terminal 104 and then from terminal 104, via electron path 114, to terminal 110. Because current flows in the opposite direction of electrons 122, terminal 110 may collect current during a discharging process (e.g., when lithium ions 120 flow from anode 108 to cathode 102).

Electrolyte 112 may be a solid state electrolyte that acts as a transport medium for lithium ions 120. Lithium ions 120 may flow between cathode 102 and anode 108 via electrolyte 112. In one embodiment, when an external voltage is applied to one of or both of cathode 102 and anode 108, the ions in electrolyte 112 may be attracted to an electrode with the opposite charge. For example, when external voltage is applied to battery cell 100, lithium ions 120 may flow from cathode 102 to anode 108. The flow of ions within electrolyte 112 may be due to electrolyte 112 having a high ionic conductivity resulting from the material composition of electrolyte 112. Electrolyte 112 may include various materials such as ethylene carbonate (EC), dimethyl carbonate (DMC), propylene carbonate, fluorinated ethylene carbonate, and/or lithium salts (e.g., $LiClO_4$, $LiPF_6$, and the like).

Electron path 114 may be a path through which electrons 122 flow between cathode 102 and anode 108. Electrolyte 112 may allow the flow of lithium ions 120 between cathode 102 and anode 108 while preventing the flow of electrons 122 between cathode 102 and anode 108. Because the electrons 122 cannot flow via electrolyte 112, they instead flow between cathode 102 and anode 108 via electron path 114. In one embodiment, device 116 may be attached to electron path 114 and during a discharging process electrons 122 flowing through electron path 114 (from anode 108 to cathode 102) may power device 116. In one embodiment, device 116 may only be attached to electron path 114 during a discharge process. In such an embodiment, during a charging process when an external voltage is applied to battery cell 100, device 116 may be directly powered or partially powered by the external voltage source.

Device 116 may be a parasitic load attached to battery cell 100. Device 116 may operate based at least in part off of power produced by battery cell 100. Device 116 may be various devices such as an electronic motor, a laptop, a computing device, a processor, and/or one or more electronic devices. Device 116 may not be a part of battery cell 100, but instead relies on battery cell 100 for electrical power. For example, device 116 may be an electronic motor that receives electric energy from battery cell 100 via electron path 114 and device 116 may convert the electric energy into mechanical energy to perform one or more functions such as acceleration in an EV. During a charging process, when an external power source is connected to battery cell 100, device 116 may be powered by the external power source (e.g., external to battery cell 100). During a discharging process, when an external power source is not connected to battery cell 100, device 116 may be powered by battery cell 100.

Figure 2B:
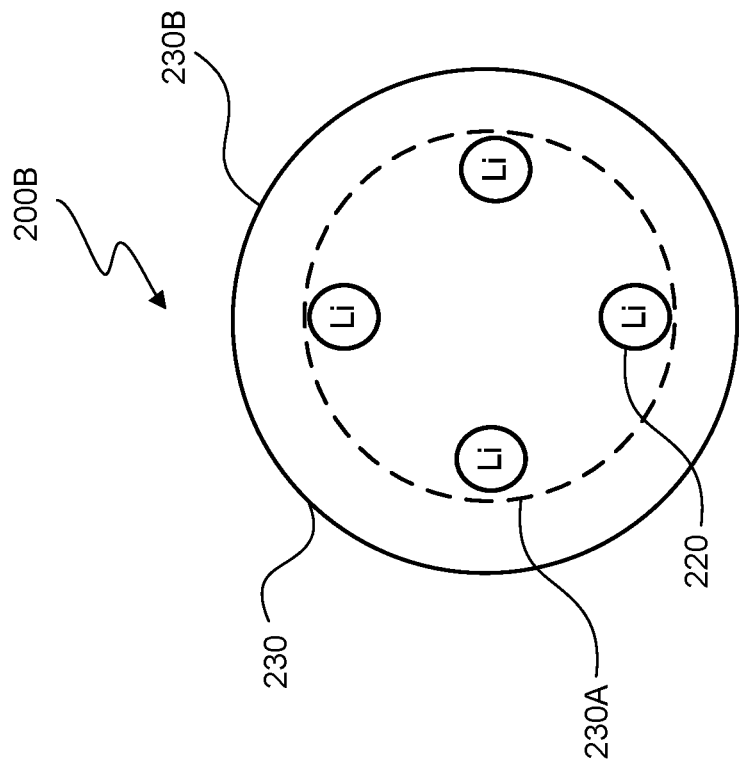
FIG. 2B illustrates a silicon-containing material in an ion-intercalated state according to an embodiment as disclosed herein.
Figure 2A:
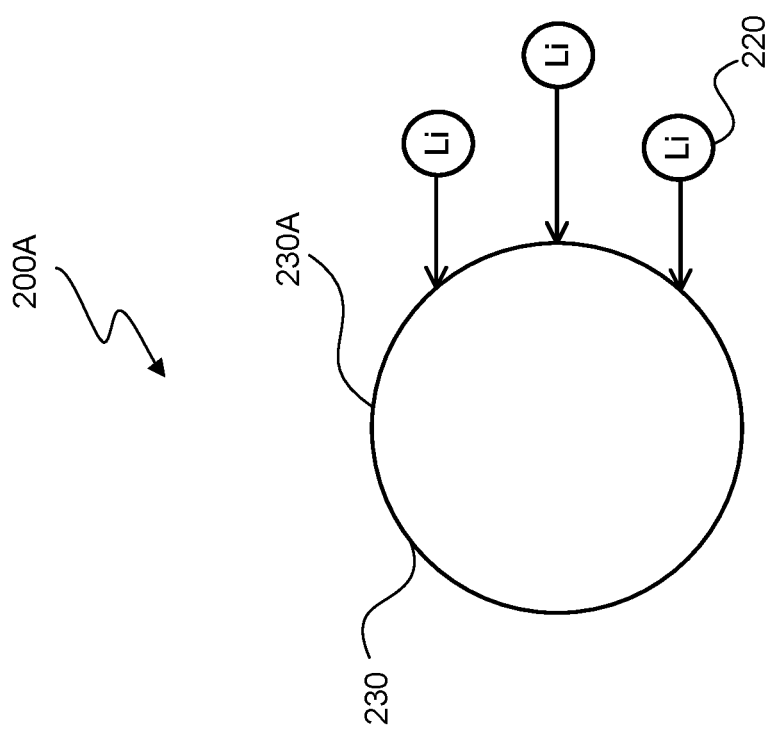
FIG. 2A illustrates a silicon-containing material in a pre-intercalation state according to an embodiment as disclosed herein.

During a charging process, such as those described above, silicon-containing material may swell. As lithium ions intercalate into silicon-containing material during the charging process, the silicon may swell to accommodate for the intercalated ions. FIGS. 2A and 2B depict a volumetric change of silicon-containing material 230 from a pre-intercalation state to silicon-containing material 230 in an ion-intercalated state. Silicon-containing material 230 may be part of a silicon-containing anode, such as anode 108 discussed above. As depicted in embodiment 200A, silicon-containing material 230 may have a pre-intercalation volume 230A when in a pre-intercalation state. In embodiments, a pre-intercalation state may mean, in part, that no or a negligible amount of lithium ions 220 may be intercalated within silicon-containing material 230. Such a pre-intercalation state may occur prior to a charging process and/or after a discharging process. As used herein, the terms intercalation, intercalated, and intercalate, may refer to a reversible inclusion or insertion of an ion (e.g., lithium ions 220) into a material having a layered or crystalline structure (e.g., silicon-containing material 230).

FIG. 2A may depict the beginning of a charging process, in which silicon-containing material 230 is in a pre-intercalation state, having a pre-intercalation volume 230A. In this state, lithium ions 220 may have begun to flow towards silicon-containing material 230 because a charging process may have initiated. Once a charging process is initiated, lithium ions 220 may flow towards and intercalate into silicon-containing material 230. FIG. 2B may depict silicon-containing material 230 during or after the charging process commences. As lithium ions 220 intercalate within silicon-containing material 230, silicon-containing material 230 may swell and increase in volume to accommodate the intercalated lithium ions 220. As shown in embodiment 200B, silicon-containing material 230 may increase in volume from pre-intercalation volume 230A to ion-intercalated volume 230B as lithium ions 220 intercalate into silicon-containing material 230. In embodiments, ion-intercalated volume 230B may be up to 25 percent, up to 50 percent, up to 100 percent, up to 150 percent, up to 200 percent, up to 300 percent, up to 400 percent or more greater than pre-intercalation volume 230A. The electrochemical and/or chemical properties and interactions, such as van der Waal interactions, between lithium ions 220 and silicon-containing material 230 may cause part or all of the swelling of the silicon-containing material. The reference to "volume" as used herein may refer to an atom, ion, compound, or material's ionic volume.

Figure 3C:
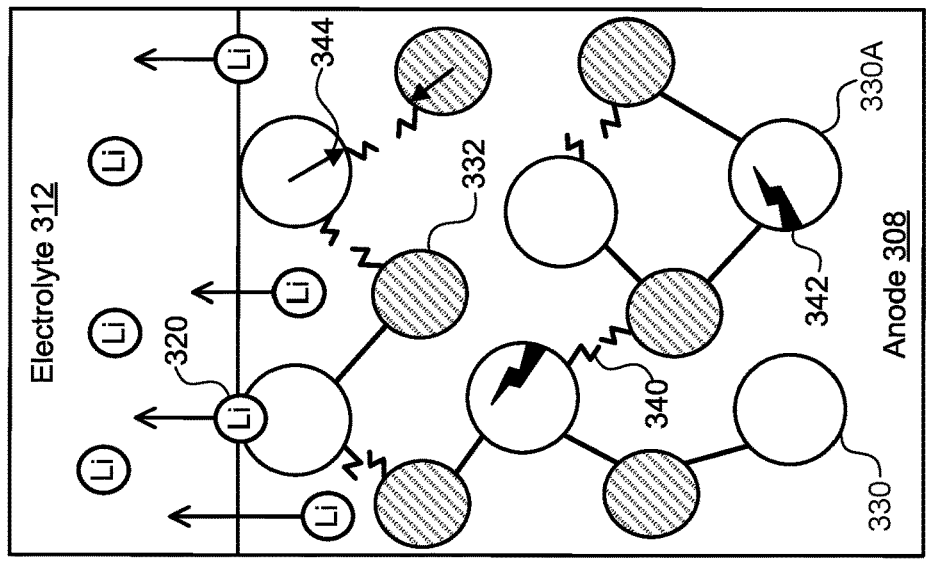
FIG. 3C illustrates a silicon-containing anode including a silicon-containing material and an anode material in a post-intercalation state according to an embodiment as disclosed herein.
Figure 3B:
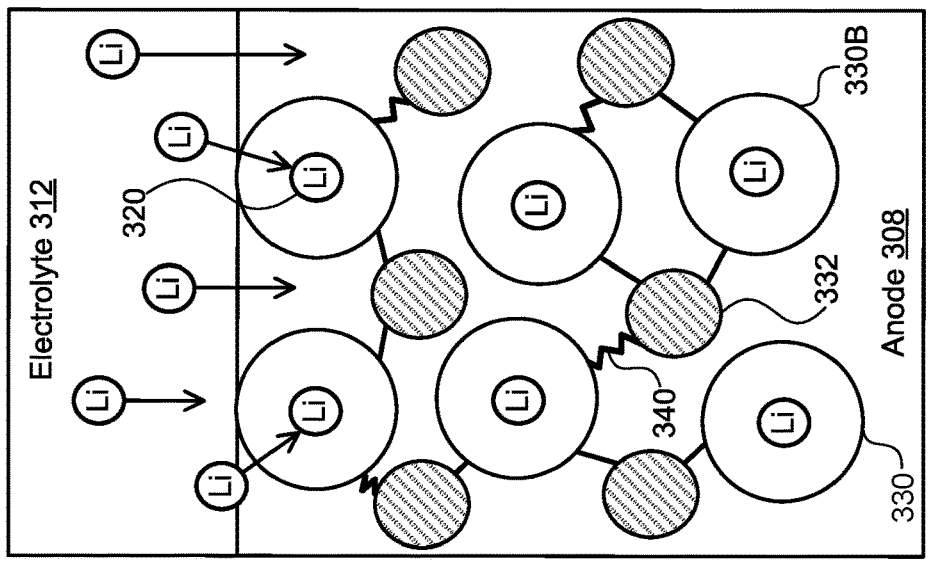
FIG. 3B illustrates a silicon-containing anode including a silicon-containing material and an anode material in an ion-intercalated state according to an embodiment as disclosed herein.
Figure 3A:
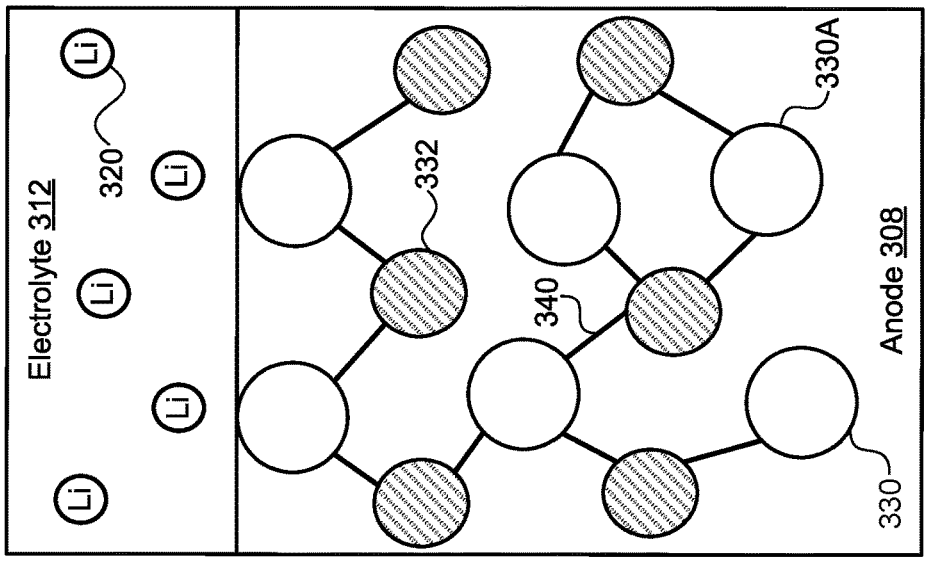
FIG. 3A illustrates a silicon-containing anode including a silicon-containing material and an anode material in a pre-intercalation state according to an embodiment as disclosed herein.

The swelling of silicon-containing material 230 may cause stress to an anode structure of a silicon-containing anode, such as anode 108 containing silicon-containing material 230. Stress to the anode structure may lead to degradation and may negatively impact the workable life and energy density capacity of a battery cell containing the silicon-containing anode. For example, as silicon-containing material 230 swells, increasing in volume from pre-intercalation volume 230A to ion-intercalated volume 230B, tensile stresses may develop in the silicon-containing material's surface, causing cracks. Cracks on the surface of silicon-containing material 230 may create new surfaces upon which solid electrolyte interface (SEI) may form. Lithium plating may also occur at these cracks. Both SEI and lithium plating may cause irreversible capacity loss for a battery cell. FIGS. 3A, 3B, and 3C illustrate the damaging effects of silicon-containing material 230 swelling.

FIG. 3A illustrates silicon-containing anode 308 including silicon-containing material 330 in a pre-intercalation state (e.g., before a charging process). Silicon-containing material 330 may have pre-intercalation volume 330A because no or a negligible amount of lithium ions 320 have intercalated into silicon-containing material 330. Silicon-containing anode 308 may be proximate to electrolyte 312. Both silicon-containing anode 308 and electrolyte 312 may be part of a battery cell, such as battery cell 100. Silicon-containing anode 308 may contain silicon-containing material 330 and anode material 332. Exemplary silicon-containing material 330 may include silicon carbon composites (e.g., silicon carbide), silicene, silicon oxides (e.g., $SiO_x$ such as $SiO$, $SiO_2$, $SiO_3$, $SiO_4$, and $Si_2O_5$), or lithium (e.g., lithium titanate, lithium metal, lithium-tin alloys). In embodiments, anode material 332 may include silicon carbon composites, silicon oxides, lithium (e.g., lithium titanate, lithium metal, lithium-tin alloys), and/or compounds including silicon carbon composites, silicon oxides, and/or lithium. Anode material 332 may be compatible with a lithium-ion battery chemistry, in part, because of anode material 332's porosity and conductive mechanical properties. The amount of silicon-containing material 330 within silicon-containing anode 308 and the proportion of anode material 332 to silicon-containing material 330 may depend on the application of the battery cell. In some embodiments, silicon-containing anode 308 may include 3 to 10 percent silicon-containing material 330 by weight, 5 to 10 percent silicon-containing material 330 by weight, 5 to 25 percent silicon-containing material 330 by weight, 3 to 30 percent silicon-containing material 330 by weight, 10 to 30 percent silicon-containing material 330 by weight, 10 to 50 percent silicon-containing material 330 by weight, 25 to 50 percent silicon containing material 330 by weight, or 40 to 60 percent silicon-containing material 330 by weight. Optionally, silicon-containing anode 308 may include additional materials in addition to silicon-containing material 330 and anode material 332. For example, additional materials may include lithium (e.g., lithium titanate, lithium metal, lithium-tin alloys).

Silicon-containing material 330 and anode material 332 may form an anode structure. Generally, the anode structure, in particular the silicon-containing material 330, may have a crystalline structure. Bonds 340 may form between the different materials within silicon-containing anode 308. For example, bonds 340 may form between silicon-containing material 330 and anode material 332, bonds 340 may form between silicon-containing material 330 and proximate silicon-containing material 330, bonds 340 may form between anode material 332 and proximate anode material 332, or bonds 340 may form between either silicon-containing material 330 or anode material 332 and additional materials. Molecular interactions, such as electron interactions and affinities, may influence the orientation, bonding angles, and structure of bonds 340.

Anode 308 may contact electrolyte 312. Although electrolyte 312 is depicted as segmented from anode 308, it may be appreciated that in embodiments electrolyte 312 may be liquid. In such embodiments, anode 308 may be submersed in electrolyte 312. The arrangement depicting electrolyte 312 as segmented from anode 308 throughout the figures may be for ease of explanation.

Silicon-containing material 330 may be the same as silicon-containing material 230, specifically in that silicon-containing material 330 may swell or increase in volume during a charging process. FIG. 3B illustrates silicon-containing anode 308 during a charging process. During a charging process, lithium ions 320 may intercalate into silicon-containing material 330. Although only a single lithium ion 320 is depicted as intercalated within silicon-containing material 330 in FIG. 3B, up to 4.4 lithium ions 320 may intercalate into each particle (e.g., atom) of silicon-containing material 330. In various embodiments, more than 4.4 lithium ions 320 may intercalate, depending on the composition of silicon-containing material 330. Intercalated lithium ions 320 may cause silicon-containing material 330 to swell, increasing in volume from pre-intercalation volume 330A, depicted in FIG. 3A, to ion-intercalated volume 330B, depicted in FIG. 3B. Because of the anode structure formed by silicon-containing material 330 and anode material 332, specifically bonds 340, tensile stresses may develop as silicon-containing material 330 swells. The crystalline nature of the anode structure may exert forces on silicon-containing material 330. Bonds 340 may become compressed or misaligned as silicon-containing material 330 swells to ion-intercalated volume 330B, adding further stress to the anode structure and silicon-containing material 330.

FIG. 3C illustrates silicon-containing anode 308 in a post-intercalation state. Specifically, FIG. 3C illustrates exemplary damage that may be caused by silicon-containing material 330 swelling to ion-intercalated volume 330B. During swelling, damage may occur to silicon-containing material 330. For example, tensile stresses exerted developed during the swelling of silicon-containing material 330 may cause cracks 342, fissures, or voids to form on the surface of or within silicon-containing material 330. Damage may also occur to the anode structure itself. For example, bonds 340 may break under the tensile stress of swelling, as depicted in FIG. 3C, or bonds 340 may become misaligned or disoriented. Other damage caused by the swelling of silicon-containing material 330 may include portions of the anode structure pulling away from the silicon-containing material 330. The silicon-containing material 330 may form a conductive matrix which may require being in contact with anode material 332 or the anode structure to ensure electrical pathways. If silicon-containing material 330 pulls away from the anode structure, gaps 344 may form. If gaps 344 form, that portion of anode 308 may no longer be electrochemically active. Gap 344 may result in capacity loss or a reduction in energy density attainable by anode 308 during charging and/or discharging, or complete loss of electrical pathways within anode 308. In some cases, cracking may also occur along an interface formed between electrolyte 312 and anode 308 contacting one another. Propagation of cracks along the interface or cracks 342 on the surface or within silicon-containing material 330 may form new surfaces for undesirable lithium plating or SEI to occur. Lithium plating may be undesirable because lithium plating may cause irreversible energy density or capacity loss to the battery cell. Although, FIG. 3C illustrates lithium ions 320 flowing out of anode 308 and into electrolyte 312 (e.g., during a discharging process), damage, such as cracks 342, broken bonds 340, and gaps 344, to the anode structure may also occur during intercalation of lithium ions 320.

To reduce or avoid damaging swelling of silicon-containing material 330 during lithium ion 320 intercalation, silicon-containing material 330 may be placed in a pre-compressive state. By chemically toughening anode 308, in particular silicon-containing material 330, anode 308 may be more resilient during lithium ion 320 intercalation. Due to the microstructure of silicon-containing materials, such as silicon-containing material 230 and 330, silicon-containing materials may be both stronger and tougher in a compressive state than in a tensile state. This means that the compressive stresses that silicon-containing materials can sustain may be much greater than the maximum tensile stresses that the silicon-containing materials can endure. Thus, placing silicon-containing material 330 in a pre-compressive state, the inherent toughness and strength of silicon-containing material 330 may be leveraged. In embodiments, silicon-containing material 330 may be placed in a pre-compressive state that exerts compressive stresses on the surface of silicon-containing material 330 that exceeds the magnitude of the tensile stresses exerted on the surface during lithium ion 320 intercalation.

Figure 4B:
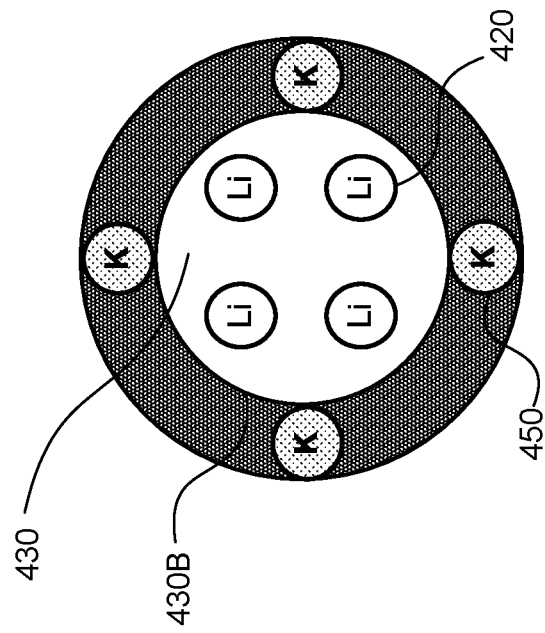
FIG. 4B illustrates a silicon-containing material enhanced with potassium ions in an ion-intercalated state according to an embodiment as disclosed herein.
Figure 4A:
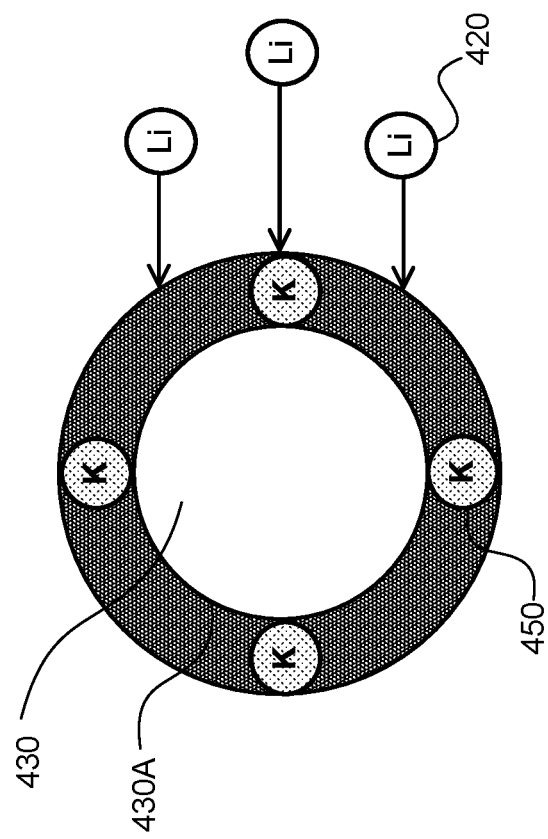
FIG. 4A illustrates a silicon-containing material enhanced with potassium ions in a pre-intercalation state according to an embodiment as disclosed herein.

Turning now to FIGS. 4A and 4B, an embodiment of silicon-containing material 430 in a pre-compressive state is illustrated. In embodiments, silicon-containing material 430 may be the same as silicon-containing material 230 or 330, and may be part of an anode in a battery cell, such as anode 108 in battery cell 100. Silicon-containing material 430 may be placed in a pre-compressive state by enriching silicon-containing material 430 with potassium ions 450. Potassium ions 450 may hold silicon-containing material 430 in a pre-compressive state. Due to the size and ionic characteristics of potassium ions 450, potassium ions 450 may exert compressive forces on silicon-containing material 430 that are equal to or greater than the tensile stresses exerted by intercalated lithium ions 420. As depicted in FIGS. 4A, silicon-containing material 430 enriched with potassium ions 450 may have a pre-intercalation volume 430A. That is, before lithium ions 420 intercalate into silicon-containing material 430, such as during a charging process, silicon-containing material 430 may have pre-intercalation volume 430A. In embodiments, pre-intercalation volume 430A of silicon-containing material 430 enriched with potassium ions 450 may be the same as a pre-intercalation volume of silicon-containing material 430 without potassium ions 450, such as for example pre-intercalation volume 330A. However, in other embodiments, pre-intercalation volume 430A of silicon-containing material 430 enriched with potassium ions 450 may be smaller than pre-intercalation volume 330A without potassium ions due to the compressive forces exerted by potassium ions 450 on silicon-containing material 430. Or in other embodiments, pre-intercalation volume 430A may be greater than pre-intercalation volume 330A without potassium ions 450.

As depicted in FIG. 4B, pre-intercalation volume 430A may be the same or similar to ion-intercalated volume 430B. Because of the compressive forces exerted by potassium ions 450 on silicon-containing material 430, silicon-containing material 430 may be maintained in a pre-compressive state and be unable to swell during lithium ion 420 intercalation. In contrast to embodiments were silicon-containing material is not enriched with potassium ions 450, such as those illustrated in FIG. 3A-3C, silicon-containing material 430 enhanced with potassium ions 450 may not swell. Silicon-containing material 430 enhanced with potassium ions 450 may not swell such that there is no or a negligible volume change between pre-intercalation volume 430A and ion-intercalated volume 430B.

Figure 5C:
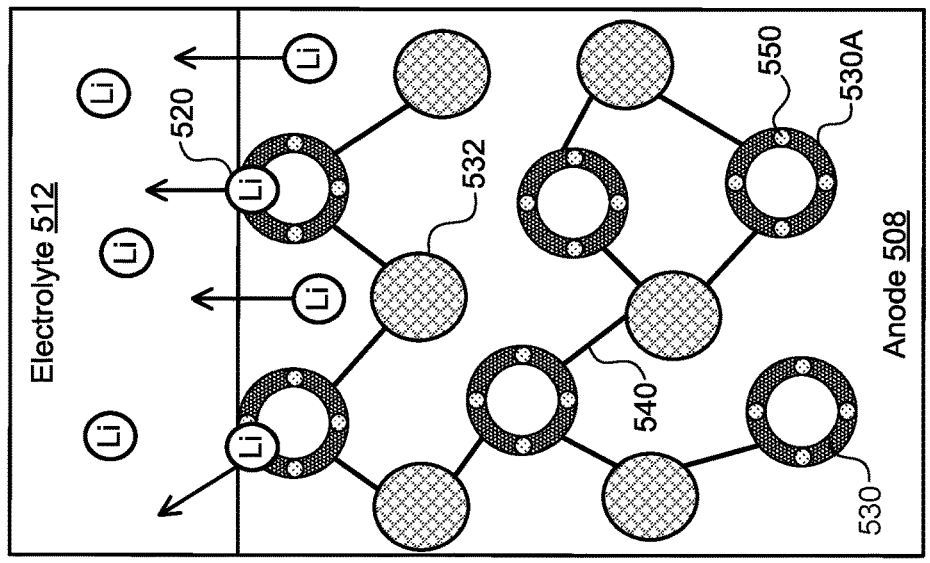
FIG. 5C illustrates a silicon-containing anode enhanced with potassium ions in a post-intercalation state according to an embodiment as disclosed herein.
Figure 5B:
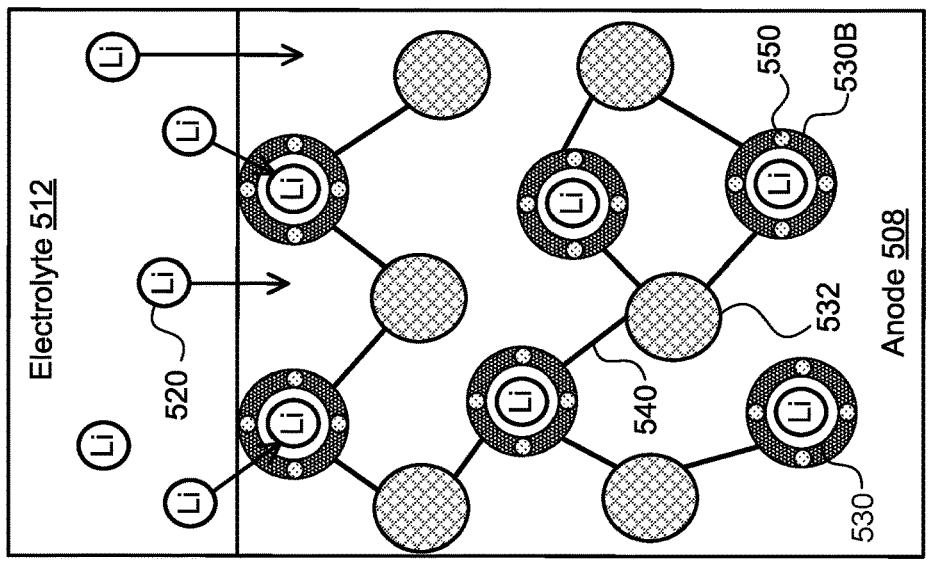
FIG. 5B illustrates a silicon-containing anode enhanced with potassium ions in an ion-intercalated state according to an embodiment as disclosed herein.
Figure 5A:
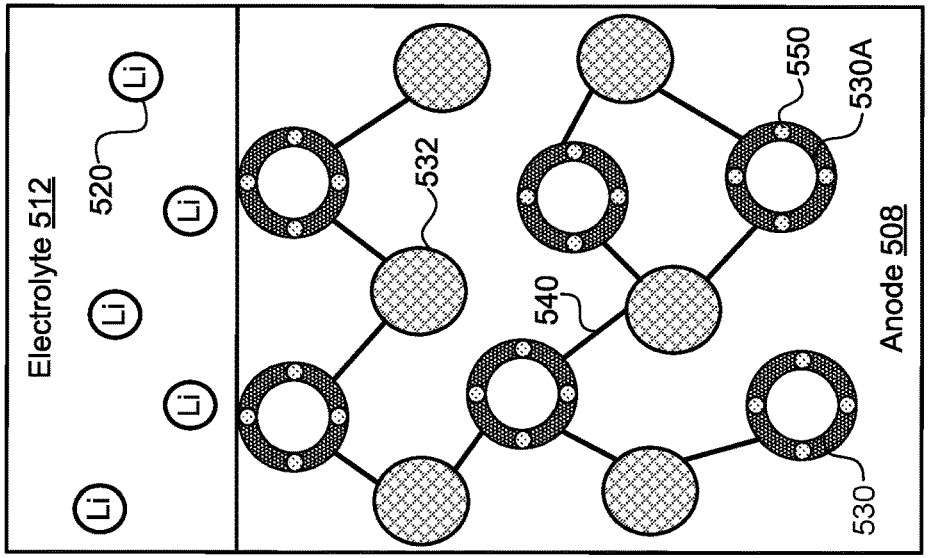
FIG. 5A illustrates a silicon-containing anode enhanced with potassium ions in a pre-intercalation state according to an embodiment as disclosed herein.

FIGS. 5A, 5B, and 5C illustrate some advantages provided by enriching silicon-containing material 530 with potassium ions 550. These advantages may be readily understood during lithium ion 520 intercalation, such as during a charging and discharging cycle. The scenario under which lithium ions 520 intercalation may be the same as the illustrated scenario depicted in FIGS. 3A, 3B, and 3C, except that silicon-containing material 530 may be enriched with potassium ions 550. Silicon-containing material 530 enriched with potassium ions 550 may be the same as silicon-containing material 430 enriched with potassium ions 450, discussed with respect to FIGS. 4A and 4B. As illustrated in FIG. 5A, silicon-containing material 530 may be part of anode 508. Anode 508 may be the same as anode 308 or 108 and may be proximate to an electrolyte 512, which may be the same as electrolyte 312 or 112. Anode 508 and electrolyte 512 may be part of a battery cell, such as battery cell 100. Silicon-containing material 530 and anode material 532 may form an anode structure having a plurality of bonds 540. Anode 508 may contact and/or be proximate to electrolyte 512 such to facilitate intercalation of lithium ions 520 into anode 508. As noted above, electrolyte 512 may be a liquid. In such embodiments, anode 508 may be immersed in electrolyte 512. For ease of explanation, electrolyte 512 is depicted as segmented from anode 508. However, it may be appreciated that electrolyte 512 may not be actually segmented from anode 508, which may instead be submersed in electrolyte 512. As depicted, silicon-containing material 530 may be enriched with potassium ions 550. Enriched silicon-containing material 530 may have a pre-intercalation volume 530A. In embodiments, silicon-containing material 530 may be in a pre-compressive state, due in part to potassium ions 550.

As illustrated in FIG. 5B, during a charging process, lithium ions 520 may flow from electrolyte 512 and into anode 508. The movement of lithium ions 520 from electrolyte 512 and into anode 508 may result in intercalation of lithium ions 520 into silicon-containing material 530. Although only a single lithium ion 520 is depicted as intercalated within silicon-containing material 530 in FIG. 5B, up to 4.4 lithium ions 520 may intercalate into each particle (e.g., atom) of silicon-containing material 530. In various embodiments, more than 4.4 lithium ions 520 may intercalate, depending on the composition of silicon-containing material 530. In contrast to embodiments where the silicon-containing material is not enriched with potassium ions 550, such as those illustrated in FIG. 3A-3C, silicon-containing material 530 may not swell during lithium ion 520 intercalation. Instead, ion-intercalation volume 530B of silicon-containing material 530 enriched with potassium ions 550 may be the same or similar to pre-intercalation volume 530A. In some embodiments, there may be minimum or no volumetric change to silicon-containing material 530 during lithium ion 520 intercalation may be due to compressive forces exerted on silicon-containing material 530 by potassium ions 550. By being in a pre-compressive state, silicon-containing material 530 may undergo little to no swelling, which may minimize damage to the anode structure.

FIG. 5C illustrates anode 508 in a post-intercalation state, which may be during a discharging process or after a charging process. During such a process, lithium ions 520 may flow from anode 508, in particular silicon-containing material 530, and into electrolyte 512. As depicted, minimal to no damage may be done to anode 508, in particular the anode structure and silicon-containing material 530, during the charging or discharging process. Bonds 540 may remain intact and in the same state between FIG. 5A and FIG. 5C. The surface of silicon-containing material 530 may remain intact, with little to no crack propagation. And the anode structure may remain in contact silicon-containing material 530, which may form a conductive matrix, with little or no gaps forming between anode material 532 and silicon-containing material 530.

Figure 6C:
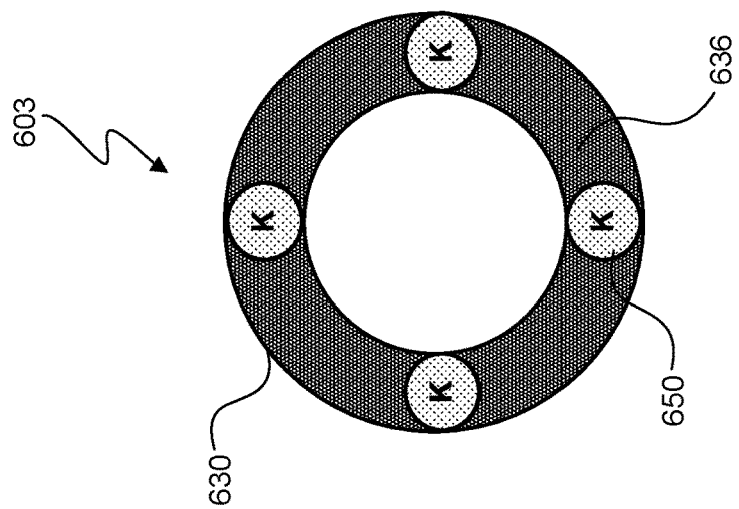
FIG. 6C illustrates the silicon-containing material of FIG. 6A enhanced with potassium ions according to an embodiment as disclosed herein.
Figure 6B:
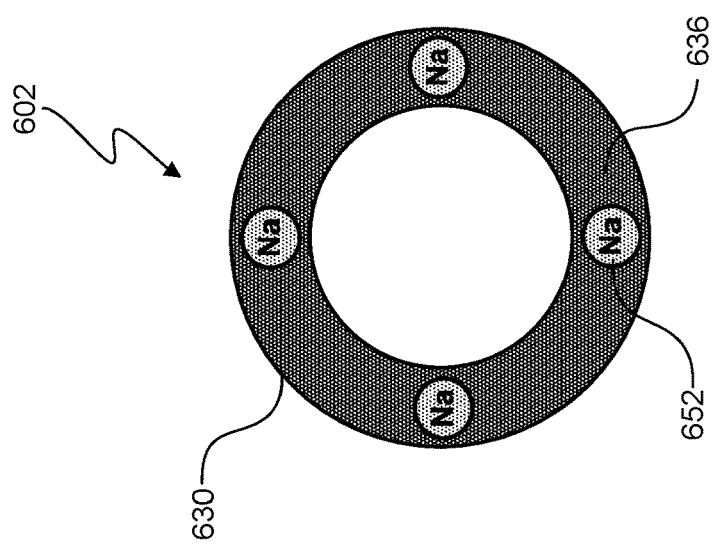
FIG. 6B illustrates the silicon-containing material of FIG. 6A enriched with sodium ions according to an embodiment as disclosed herein.
Figure 6A:
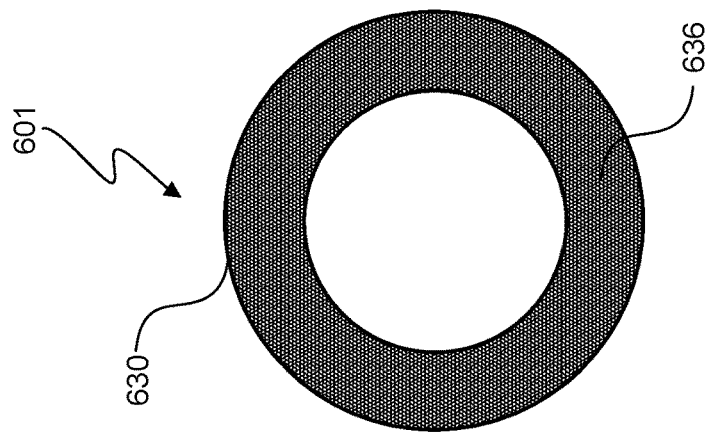
FIG. 6A illustrates a silicon-containing material prior to being enhanced according to an embodiment as disclosed herein.

Turning now to FIGS. 6A, 6B, and 6C, a process for enriching silicon-containing material 630 with potassium ions 650 is provided. At view 601 of FIG. 6A, silicon-containing material 630 may be providing having not been enriched. Silicon-containing material 630 may be the same as silicon-containing material 230, 330, 430, or 530. Silicon-containing material 630 may be suitable for incorporating into an anode, such as anode 108, 308, and 508. Exemplary silicon-containing materials 630 include silicene, silicon oxides (e.g., $SiO_x$ such as $SiO$, $SiO_2$, $SiO_3$, $SiO_4$, and $Si_2O_5$), and silicon carbide. In embodiments, a silicon-containing anode, such as anode 108, 308, and 508, may be provided at view 601. The silicon-containing anode provided in FIG. 6A, may have reversible electrochemical capabilities such to allow repeated cycles of a charging process and a discharging process without impacting the energy density or workable life of the silicon-containing anode. For example, in one embodiment, the silicon-containing anode may have reversible electrochemical capabilities such that the anode, as part of a battery cell, can maintain a consistent state of charge for 50 days with normal use. Optionally, the silicon-containing anode may contain silicon-containing material 630 and may also contain an anode material compatible with a lithium-ion battery chemistry.

To chemically toughen silicon-containing material 630, silicon-containing material 630 may be enriched with sodium ions. As depicted by view 602 at FIG. 6B, surface layer 636 of silicon-containing material 630 may be enriched with sodium ions 652. Enriching surface layer 636 of silicon-containing material 630 with sodium ions 652 may include interspersion of sodium ions 652 between the silicon particles (e.g., silicon atoms) of the silicon-containing material 630. Surface layer 636 may extend from a surface of silicon-containing material 630 towards a bulk or center of silicon-containing material 630. In embodiments, the surface layer 636 may extend from the surface of the silicon-containing material 630 to a depth of 1 nm, 5 nm, 10 nm, 25 nm, 50 nm, 100 nm, 250 nm, 500 nm, 750 nm or more.

In embodiments, enriching surface layer 636 with sodium ions 652 may include immersing silicon-containing material 630 in a sodium-containing solution. For example, silicon-containing material 630 may be immersed in a salt bath or a sodium nitrate solution (e.g., sodium nitrate bath). The sodium-containing solution may be held at a high temperature during the immersion of silicon-containing material 630. For example, the sodium-containing solution temperature may be higher than 300° C., 350° C., 400° C., 450° C., 500° C., 550° C., 600° C., or higher. The amount of time that silicon-containing material 630 may be immersed within the sodium-containing solution may depend on the silicon content in silicon-containing material 630. For example, the higher the silicon content in silicon-containing material 630, the longer silicon-containing material 630 may be required to be immersed in the sodium-containing solution. In embodiments, the time duration of silicon-containing material 630 immersion in the sodium-containing solution may be proportional, linear, or exponentially related to the silicon content of silicon-containing material 630. In exemplary embodiments, silicon-containing material 630 may be immersed for more than 5 minutes, more than 10 minutes, more than 15 minutes, more than 30 minutes, more than 45 minutes, more than 1 hour, more than 2 hours, more than 3 hours, more than 6 hours, more than 12 hours, more than 24 hours, more than 36 hours, or longer, depending on the silicon content, temperature of the sodium-containing solution, composition of the sodium-containing solution, and other reaction variables.

Sodium ions 652 may exert compressive forces on silicon-containing material 630, however due to the size and ionic or electrochemical properties of sodium ions 652, sodium ions 652 may not be able to adequately counteract the tensile forces exerted during swelling of silicon-containing material 630 with lithium ions in some embodiments. Accordingly, it may be desirable to displace sodium ions 652 with potassium ions 650. View 603 in FIG. 6C, depicts surface layer 636 of silicon-containing material 630 enriched with potassium ions 650. By displacing sodium ions 652 with potassium ions 650, a compression layer in the silicon-containing anode (e.g., within surface layer 636) may form, placing silicon-containing material 630 in a pre-compressive state. To displace sodium ions 652 that are interspersed throughout surface layer 636 of silicon-containing material 630, silicon-containing material 630 enriched with sodium ions 652 may be immersed in a potassium-containing solution. In embodiments, only surface layer 636 of silicon-containing material 630 may be immersed in the potassium-containing solution, however, in other embodiments, the entirety of silicon-containing material 630 may be immersed.

Exemplary potassium-containing solutions may include a potassium nitrate solution. When silicon-containing material 630 is immersed in the potassium-containing solution, the potassium-containing solution may be held at a high temperature. In embodiments, the temperature of the potassium-containing solution may be lower than the temperature of the sodium-containing solution. For example, the temperature of the potassium-containing solution may be at or above 150° C., 200° C., 250° C., 300° C., 350° C., 400° C., 450° C., or higher. The amount of time that silicon-containing material 630 may be immersed within the potassium-containing solution may depend on the silicon content in silicon-containing material 630 and/or the amount of sodium ions 652 enriched within surface layer 636. For example, the higher the enrichment of sodium ions 652 within surface layer 636, the longer silicon-containing material 630 may be required to be immersed in the potassium-containing solution. In embodiments, the time duration of silicon-containing material 630 immersion in the potassium-containing solution may be proportional, linear, or exponentially related to the silicon content and/or sodium ion 652 content. In exemplary embodiments, silicon-containing material 630 may be immersed for more than 5 minutes, more than 10 minutes, more than 15 minutes, more than 30 minutes, more than 45 minutes, more than 1 hour, more than 2 hours, more than 3 hours, more than 6 hours, more than 12 hours, more than 24 hours, more than 36 hours, or longer, depending on the silicon content, level of sodium ion 652 enrichment, temperature of the potassium-containing solution, composition of the potassium-containing solution, and other reaction variables.

Because potassium ions 650 are larger than sodium ions 652, potassium ions 650 enriched within surface layer 636 may provide larger compressive stresses to silicon-containing material 630. Enriching surface layer 636 with potassium ions 650 may chemically toughen the silicon-containing anode by placing silicon-containing material 630 in a pre-compressive state. By placing silicon-containing material 630 in a pre-compressive state, internal tensile stresses exerted on silicon-containing material 630 during lithium ion intercalation (e.g., swelling of silicon-containing material 630) may be counteracted. Due to the silicon content of the silicon-containing anode, the stresses exerted on silicon-containing material 630 during intercalation, may be primarily internal stresses, propagating from within a bulk or center of the silicon-containing anode mass, as opposed to stress propagating on a surface of the silicon-containing anode. Internal stress may be undesirable because of the density and damage propagation potential of silicon-containing material 630. This chemical toughening process may lead to improved cyclability as the propensity for cracking within the silicon-containing anode may be decreased substantially.

Figure 7:
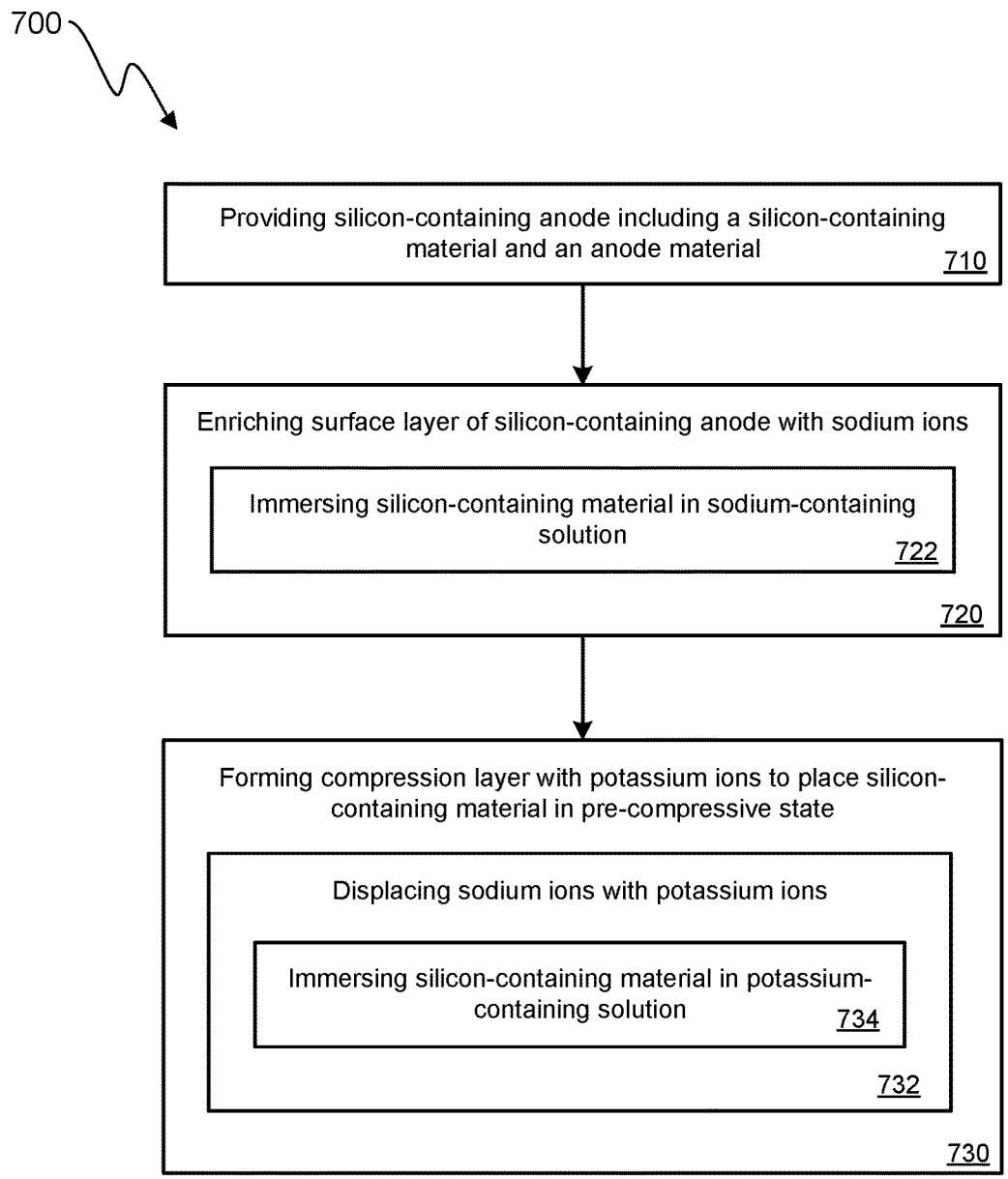
FIG. 7 illustrates a flow diagram for a method of enhancing a silicon-containing anode according to an embodiment as disclosed herein.

Various methods may be performed to achieve the above discussed enhanced silicon-containing anode. FIG. 7 illustrates an embodiment of method 700 for enriching a silicon-containing anode for a battery cell as disclosed herein. Method 700 may include providing a silicon-containing anode at block 710. The silicon-containing anode may be the same or similar to silicon-containing anode 108 or 308. The silicon-containing anode may include a silicon-containing material and an anode material. For example, the silicon-containing anode may include silicon-containing material 230, 330, 430, 530, or 630 and anode material 332 or 532. The content and proportion of silicon-containing material to anode material may vary depending on the application of the silicon-containing anode. In embodiments, the silicon-containing anode may include 3 to 10 percent silicon-containing material 330 by weight, 5 to 10 percent silicon-containing material, 5 to 25 percent silicon-containing material, 3 to 30 percent silicon-containing material 330 by weight, 10 to 30 percent silicon-containing material, 10 to 50 percent silicon-containing material, 25 to 50 percent silicon containing material, or 40 to 60 percent silicon-containing material. Optionally, the silicon-containing anode may include additional materials in addition to the silicon-containing material and the anode material. For example, additional materials may include lithium (e.g., lithium metal, lithium titanate, or lithium tin alloys).

At block 720, method 700 may include enriching a surface layer of the silicon-containing anode with sodium ions. In embodiments, enriching the surface layer of the silicon-containing anode may include enriching a surface layer of the silicon-containing material within the silicon-containing anode. For example, the surface layer may be surface layer 636. Block 720 may include block 722. At block 722, enriching the surface layer of the silicon-containing anode with sodium ions may include immersing the silicon-containing material in a sodium-containing solution. For example, the sodium-containing solution may be a salt bath or a sodium nitrate solution. In embodiments, only the surface layer of the silicon-containing anode may be immersed, while in other embodiments the entirety of the silicon-containing anode may be immersed in the sodium-containing solution. As discussed above, the duration that the silicon-containing anode may be immersed within the sodium-containing solution may vary depending on a number of variables, such as silicon content of the silicon-containing anode, the temperature of the sodium-containing solution, and reaction parameters. When immersed within the sodium-containing solution, a plurality of sodium ions may intersperse between the silicon particles (e.g., silicon atoms) within the silicon-containing material. Specifically, the sodium ions may intersperse between the silicon particles (e.g., silicon atoms) within a surface layer of the silicon-containing material.

At block 730, method 700 may include forming a compression layer with potassium ions to place the silicon-containing material in a pre-compressive state. As discussed above, by placing the silicon-containing material in a pre-compressive state, internal tensile stresses may be counteracted during lithium ion intercalation to reduce or substantially eliminate damage to the silicon-containing material. To form a compression layer, block 730 may include block 732. At block 732, the sodium ions interspersed within the silicon-containing material may be displaced with potassium ions. The potassium ions may displace the sodium ions such to form a compression layer in the silicon-containing anode. For example, the potassium ions may take the place of the sodium ions within the surface layer of the silicon-containing material. The size of the potassium ions may exert compressive forces on the silicon-containing material to place the silicon-containing material in a pre-compressive state. In embodiments, not all of the sodium ions may be displaced by the potassium ions, such that the enhanced silicon-containing anode may include at least some sodium ions.

At block 734, displacing the sodium ions with potassium ions may include immersing the silicon-containing material in a potassium-containing solution. For example, the silicon-containing material may be immersed in a potassium nitrate bath. In embodiments, the silicon-containing material may be immersed in the potassium-containing solution, while in others the silicon-containing anode may be immersed in the potassium-containing solution. Optionally, only a surface layer may be immersed, while in other cases, the entirety of the silicon-containing material or silicon-containing anode may be immersed. As discussed above, the duration that the silicon-containing anode may be immersed within the potassium-containing solution may vary depending on a number of variables, such as silicon content of the silicon-containing anode, the level of enrichment of sodium ions, the temperature of the potassium-containing solution, and reaction parameters. In some cases, the temperature of the potassium-containing solution may be less than the temperature of the sodium-containing solution.

By immersing the silicon-containing material in the potassium-containing solution after the sodium-containing solution, the potassium ions may more readily intersperse within the silicon-containing material. The silicon-containing material may have a crystalline or lattice structure, and by first enhancing the silicon-containing material with sodium ions, which are smaller than potassium ions, the silicon-containing material may be less prone to bond breakage or damage to the crystalline structure when the larger potassium ions intersperse between the silicon particles (e.g., atoms). The larger size and ionic or electrochemical properties of the potassium ions may exert compressive forces on the silicon-containing material such to place the silicon-containing material in a pre-compressive state. In a pre-compressive state, the silicon-containing material may be unable to swell (e.g., increase in volume) during lithium ion intercalation. Accordingly, the silicon-containing material may be less prone to damage when in a pre-compressive state.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for enhancing a silicon-containing anode for a battery cell, the method comprising:
providing a silicon-containing anode having reversible electrochemical capabilities comprising a silicon-containing material and an anode material compatible with a lithium-ion battery chemistry having porous and conductive mechanical properties;
forming a compression layer in the silicon-containing anode, wherein the compression layer is formed by potassium ions placing the silicon atoms of the silicon-containing material in a pre-compressive state to counteract internal stress exerted on the silicon-containing material.

2. The method for enhancing the silicon-containing anode for a battery cell of claim 1, wherein forming the compression layer in the silicon-containing anode comprises enriching a surface layer of the silicon-containing anode.

3. The method for enhancing the silicon-containing anode for a battery cell of claim 2, wherein enriching the surface layer of the silicon-containing anode comprises immersing the silicon-containing material in a sodium-containing solution to form a sodium-ion enriched surface layer.

4. The method for enhancing the silicon-containing anode for a battery cell of claim 3, wherein enriching the surface layer of the silicon-containing anode further comprises maintaining the silicon-containing material in the sodium-containing solution at a temperature within a range from 300° C. to 600° C.

5. The method for enhancing the silicon-containing anode for a battery cell of claim 4, wherein the temperature of the silicon-containing material in the sodium-containing solution is maintained for a time duration within a range from 5 minutes to 24 hours.

6. The method for enhancing the silicon-containing anode for a battery cell of claim 3, wherein forming the compression layer in the silicon-containing anode further comprises immersing the sodium-ion enriched surface layer of the silicon-containing material in a potassium-containing solution.

7. The method for enhancing the silicon-containing anode for a battery cell of claim 6, wherein the potassium-containing solution comprises a potassium nitrate solution.

8. The method for enhancing the silicon-containing anode for a battery cell of claim 2, wherein the surface layer has a thickness within a range from 1 nm to 750 nm.

9. The method for enhancing the silicon-containing anode for a battery cell of claim 1, wherein the silicon-containing anode comprises 3 to 30 percent by weight silicon.

10. The method for enhancing the silicon-containing anode for a battery cell of 1, wherein the silicon-containing material comprises at least one of a silicene, a silicon oxide, or a silicon carbide.

11. A method for enhancing a silicon-containing anode for a battery cell, the method comprising:
   providing a silicon-containing anode having reversible electrochemical capabilities comprising a silicon-containing material and an anode material compatible with a lithium-ion battery chemistry having porous and conductive mechanical properties;
   enriching a surface layer of the silicon-containing anode with a plurality of first ions to intersperse the plurality of first ions between silicon atoms of the silicon-containing material; and
   displacing the plurality of first ions with a plurality of second ions to form a compression layer in the silicon-containing anode, wherein the plurality of second ions:
      have a size that is larger than the size of the plurality of first ions; and
      places the silicon atoms of the silicon-containing material in a pre-compressive state to counteract internal stress exerted on the silicon-containing material.

12. The method for enhancing the silicon-containing anode for a battery cell of 11, wherein the plurality of first ions comprises sodium ions.

13. The method for enhancing the silicon-containing anode for a battery cell of 11, wherein the plurality of second ions comprises potassium ions.

14. The method for enhancing the silicon-containing anode for a battery cell of 11, wherein enriching the surface layer of the silicon-containing anode with the plurality of first ions comprises immersing the silicon-containing material in a sodium-containing solution to form an enriched surface layer.

15. The method for enhancing the silicon-containing anode for a battery cell of 11, wherein displacing the plurality of first ions with the plurality of second ions to form the compression layer in the silicon-containing anode comprises immersing the surface layer of silicon-containing anode enriched with the plurality of first ions in a potassium-containing solution.

16. An enhanced silicon-containing anode for a battery cell, the anode comprising:
   an anode material having reversible electrochemical capabilities;
   a silicon-containing material comprising silicon particles; and
   a compression layer comprising a plurality of ions interspersed between the silicon particles in a surface layer of the silicon-containing material, wherein:
      the plurality of ions in the compression layer have a size that exerts compressive forces on the silicon particles and places the silicon-containing material in a pre-compressive state; and
      the surface layer has a thickness within a range from 1 nm to 750 nm.

17. The enhanced silicon-containing anode of claim 16, wherein the enhanced silicon-containing anode is part of a battery cell.

18. The enhanced silicon-containing anode of claim 16, wherein the silicon-containing material comprises a silicon oxide.

19. The enhanced silicon-containing anode of claim 16, wherein the silicon-containing material comprises at least one of silicene, SiC, SiO, $SiO_2$, $SiO_3$, or $SiO_4$.

20. The enhanced silicon-containing anode of claim 16, wherein the anode material comprises lithium.

* * * * *